United States Patent
Moy et al.

(10) Patent No.: US 11,270,272 B2
(45) Date of Patent: Mar. 8, 2022

(54) SYSTEMS AND METHODS FOR MANAGEMENT OF ASSET OR OBLIGATION-BACKED VIRTUAL RECEIPTS ON A DISTRIBUTED SYSTEM

(71) Applicant: JPMorgan Chase Bank, N.A., New York, NY (US)

(72) Inventors: Christine Moy, New York, NY (US); Franklin Bi, Astoria, NY (US); Alex Dockx, London (GB); David Shulman, Summit, NJ (US); Vincent Gasbarro, Secane, PA (US); Paul Martin, Fanwood, NJ (US); Tyrone Lobban, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 684 days.

(21) Appl. No.: 15/869,421

(22) Filed: Jan. 12, 2018

(65) Prior Publication Data
US 2018/0204190 A1  Jul. 19, 2018

Related U.S. Application Data

(60) Provisional application No. 62/446,185, filed on Jan. 13, 2017.

(51) Int. Cl.
*G06Q 20/40* (2012.01)
*G06Q 20/04* (2012.01)
(Continued)

(52) U.S. Cl.
CPC ......... *G06Q 20/047* (2020.05); *G06Q 20/108* (2013.01); *G06Q 20/401* (2013.01); *G06Q 40/04* (2013.01); *G06Q 40/06* (2013.01)

(58) Field of Classification Search
CPC ............ G06Q 20/0453; G06Q 20/108; G06Q 20/401; G06Q 20/047; G06Q 40/04; G06Q 40/06
See application file for complete search history.

(56) References Cited

U.S. PATENT DOCUMENTS

| | | | |
|---|---|---|---|
| 7,072,943 B2 * | 7/2006 | Landesmann | G06Q 20/10 705/39 |
| 9,760,871 B1 * | 9/2017 | Pourfallah | G06Q 20/3276 |

(Continued)

FOREIGN PATENT DOCUMENTS

| | | | | |
|---|---|---|---|---|
| WO | WO-0075834 A2 * | 12/2000 | | G06Q 20/04 |
| WO | WO-2016178999 A1 * | 11/2016 | | G06Q 20/38215 |

(Continued)

OTHER PUBLICATIONS

Cermeno, Javier, S.: Blockchain in Financial Services: Regulatory Landscape and Future Challenges for its Commercial Application, Dec. 2016, Working paper, BBVA, pp. 1-33 (Year: 2016).*

(Continued)

*Primary Examiner* — Bijendra K Shrestha
(74) *Attorney, Agent, or Firm* — Greenberg Traurig LLP

(57) ABSTRACT

Systems and methods for management of asset or obligation-backed virtual receipts on a distributed system are disclosed Systems and methods for management of asset or obligation-backed virtual receipts on a distributed system are disclosed. According to one embodiment, in an information processing apparatus for a depositary entity comprising at least one computer processor, a method for managing asset or obligation-backed virtual receipts on a distributed system may include (1) receiving confirmation of a deposit of an underlying asset, wherein the deposit encumbers the underlying asset; (2) receiving authorization to issue a virtual receipt for the deposited underlying asset; and (3)

(Continued)

executing issuance of the virtual receipt by writing the transaction to a distributed ledger.

8 Claims, 4 Drawing Sheets

(51) Int. Cl.
*G06Q 40/06* (2012.01)
*G06Q 40/04* (2012.01)
*G06Q 20/10* (2012.01)

(56) References Cited

U.S. PATENT DOCUMENTS

| | | | |
|---|---|---|---|
| 2002/0023056 A1* | 2/2002 | Udo | G06Q 40/02 705/40 |
| 2007/0118420 A1* | 5/2007 | Jung | G06Q 30/0209 705/14.12 |
| 2009/0271315 A1* | 10/2009 | Hammad | G06Q 20/322 705/41 |
| 2011/0010291 A1* | 1/2011 | Adams | G06Q 20/346 705/39 |
| 2015/0332256 A1 | 11/2015 | Minor | |
| 2015/0379510 A1* | 12/2015 | Smith | G06Q 20/3829 705/71 |
| 2016/0260171 A1* | 9/2016 | Ford | G06Q 40/04 |
| 2016/0371771 A1* | 12/2016 | Serrano | G06Q 40/025 |
| 2017/0005804 A1 | 1/2017 | Zinder | |
| 2017/0011460 A1* | 1/2017 | Molinari | G06F 21/645 |
| 2017/0046698 A1* | 2/2017 | Haldenby | G06Q 20/4016 |
| 2018/0096752 A1* | 4/2018 | Ovalle | G07F 17/3209 |

FOREIGN PATENT DOCUMENTS

| | | | | |
|---|---|---|---|---|
| WO | 2017131929 | † | 8/2017 | |
| WO | WO-2017131929 A1 | * | 8/2017 | ............. G06Q 20/06 |

OTHER PUBLICATIONS

Hayes, Adam: The Best Ways to Invest in Gold Without Holding It, Aug. 3, 2015, Investpedia, Wayback Machine, pp. 1-2 (Year: 2015).*

Wadsworth et al.: A innovation in paper receipts: The electronic receipt management system, Apr. 23, 2010, Proceedings of the 2010 IEEE, University of Virginia, Virgina , USA, pp. 88-93 (Year: 2010).*

PCT International Search Report and Written Opinion, International Application No. PCT/US18/13289, dated Apr. 4, 2018, pp. 1-7.

European Patent Office, Communication and Extended European Search Report, European Patent Application No. 18738809.5, dated Jun. 9, 2020, pp. 1-7. (The references cited in this search report were previously provided to the Office in the Information Disclosure Statement filed on Apr. 17, 2018.).

Aftar Sehra, "Software and Hardware Based Resource Allocation using Distributed Consensus Network," pp. 1-23, Oct. 2015, published by ResearchGate, DOI:10.13140/RG.2.2.13982.54086, downloaded from https://www.researchgate.net/publication/311923749.†

Avtar Sehra, "Data Transfer Across Pegged Distributed Consensus Networks," pp. 1-37, Mar. 2016, published by ResearchGate, DOI:10. 13140/RG.2.2.27404.31366, downloaded from https://www.researchgate.net/publication/311923466.†

Avtar Sehra, "Crowdaura Platform Solutions for Commercial and Investment," pp. 1-29, Apr. 2016, published by Bitcoinsardegna.it at http://www.bitcoinsardegna.it/wp/wp-content/uploads/2016/04/Crowdaura-Italy-Blockchain-Event-public.pdf.†

* cited by examiner
† cited by third party

SYSTEMS AND METHODS FOR MANAGEMENT OF ASSET OR OBLIGATION-BACKED VIRTUAL RECEIPTS ON A DISTRIBUTED SYSTEM

RELATED APPLICATIONS

This application claims the benefit of U.S. Patent Application Ser. No. 62/446,185, filed Jan. 13, 2017, the disclosure of which is hereby incorporated, by reference, in its entirety.

BACKGROUND OF THE INVENTION

1. Field of the Invention

The present disclosure generally relates to systems and methods for management of asset or obligation-backed virtual receipts on a distributed system.

2. Description of the Related Art

Depositary Receipts, or DRs, may be issued and delivered by a Depositary Entity subsequent to its acceptance into an account established at its appointed custodian of a deposit of an underlying asset or obligation from an issuer or holder of the asset or obligation that may be held, transferred, or sold on a ledger. DRs may be traded on a local stock exchange.

SUMMARY OF THE INVENTION

Systems and methods for management of asset or obligation-backed virtual receipts on a distributed system are disclosed. According to one embodiment, in an information processing apparatus for a depositary entity comprising at least one computer processor, a method for managing asset or obligation-backed virtual receipts on a distributed system may include (1) receiving confirmation of a deposit of an underlying asset, wherein the deposit encumbers the underlying asset; (2) receiving authorization to issue a virtual receipt for the deposited underlying asset; and (3) executing issuance of the virtual receipt by writing the transaction to a distributed ledger.

In one embodiment, the confirmation may be received by the depositary from its custodian that received the deposit of the underlying asset.

In one embodiment, the virtual receipt may comprise a token.

In one embodiment, the distributed ledger may be a Blockchain-based ledger.

In one embodiment, the authorization to issue the virtual receipt may be received from an asset originator.

In one embodiment, the method may further include assigning the virtual receipt to the depositor of the underlying asset; and writing the assignment to the distributed ledger.

In one embodiment, the method may further include communicating the encumbrance of the underlying asset to an asset originator.

According to another embodiment, in an information processing apparatus for a depositary entity comprising at least one computer processor, a method for managing asset or obligation-backed virtual receipts on a distributed system may include (1) receiving, from a holder of a virtual receipt for an underlying asset that is encumbered, a request to redeem or cancel the virtual receipt; (2) locking an assignment of the virtual receipt to the holder on a distributed ledger; (3) cancelling the virtual receipt; and (4) initiating a transfer of the underlying asset to the holder.

In one embodiment, the step of locking an assignment of the virtual receipt to the holder on a distributed ledger comprises associating a flag that indicates non-transferability of the underlying asset to the distributed ledger.

In one embodiment, the underlying asset may be transferred to an account designated by the holder.

In one embodiment, the step of cancelling the virtual receipt may include writing a cancellation of the virtual receipt to the distributed ledger.

In one embodiment, the distributed ledger may comprise a Blockchain-based ledger.

According to another embodiment, a system for managing asset or obligation-backed virtual receipts on a distributed system may include an asset originator; a depositary entity; and a distributed ledger. The asset originator may deposit an underlying asset with the depositary entity, wherein the deposit encumbers the underlying asset. The depositary entity may receive confirmation of the deposit of the underlying asset by the asset originator, and may receive authorization from the asset originator to issue a virtual receipt for the deposited underlying asset. It may also execute issuance of the virtual receipt by writing the transaction to a distributed ledger.

In one embodiment, the depositary entity may receive confirmation of the deposit of the underlying asset by the asset originator from a custodian that received the deposit of the underlying asset.

In one embodiment, the virtual receipt may comprise a token.

In one embodiment, the distributed ledger may comprise a Blockchain-based ledger.

In one embodiment, the depositary entity may receive authorization from the asset originator to issue a virtual receipt for the deposited underlying asset from an asset originator.

In one embodiment, the depositary entity may assign the virtual receipt to the depositor of the underlying asset and writes the assignment to the distributed ledger.

In one embodiment, the depositary entity may communicate the encumbrance of the underlying asset to an asset originator.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

According to embodiments, Virtual Depositary Receipts, or "Virtual Receipts," are asset or obligation-backed electronic tokens that may provide investors, brokers, custodians, and clearing firms with a means to link an underlying asset or obligation with its digital representation on a distributed system for the purposes of ownership tracking and transfer; transaction clearing and settlement; asset origination, distribution and securitization; and other such marketplace processes that may be facilitated on a distributed system. As used herein, a distributed system includes a distributed ledger, such as a Blockchain or Ethereum-based ledger.

Figure 1:
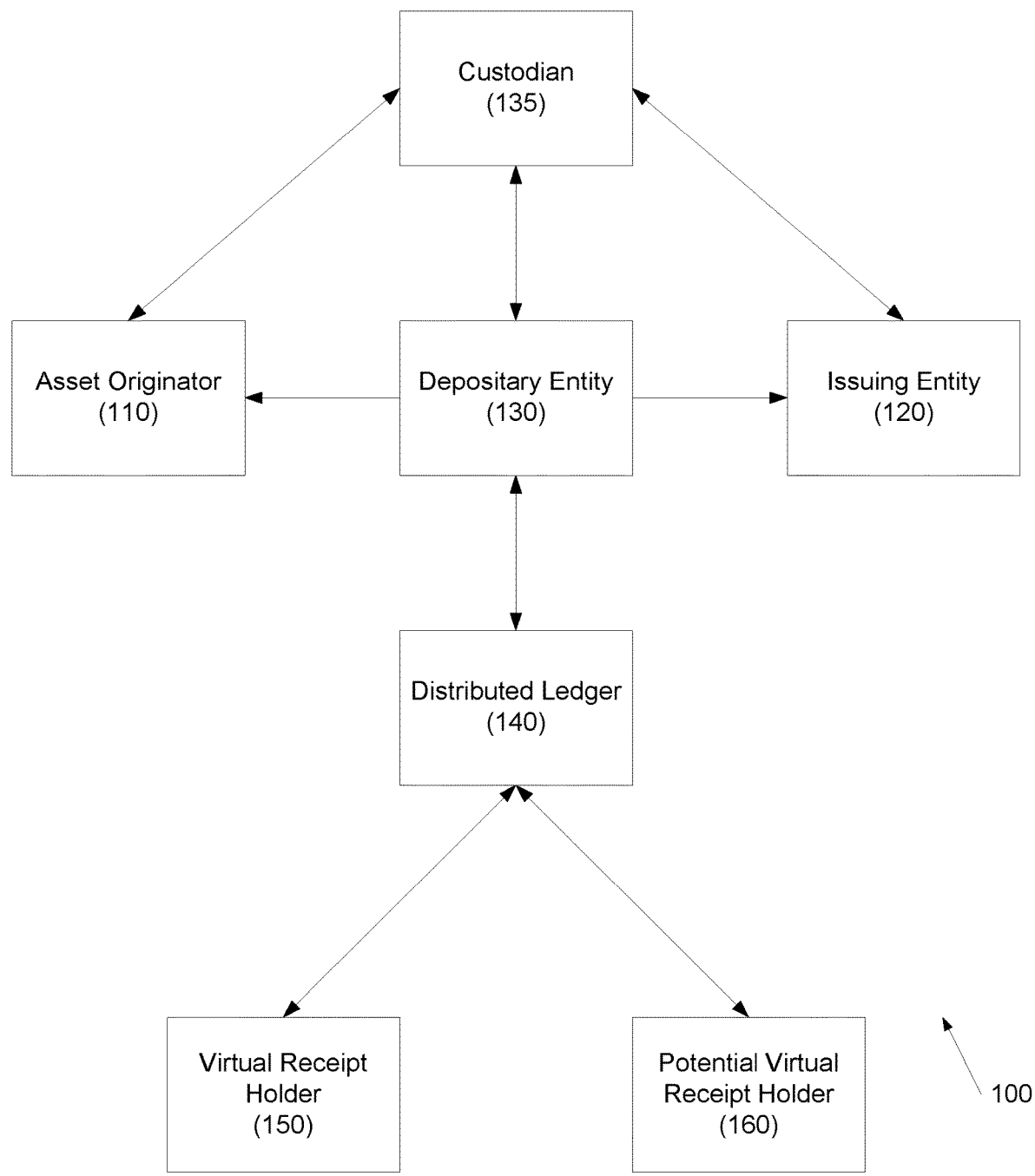
FIG. 1 depicts an exemplary system for management of asset or obligation-backed virtual receipts on a distributed system according to one embodiment.

FIG. 1 depicts an exemplary system for management of asset or obligation-backed virtual receipts on a distributed system according to one embodiment. System 100 may include asset originator 110, issuing entity 120, depositary entity 130, custodian 135, distributed ledger 140, virtual receipt holder 150, and potential virtual receipt holder 160.

In one embodiment, asset originator 110 may be an issuer, an asset owner, a broker-dealer acting on behalf of either. Asset originator 110 may be an entity holding the issued security that is looking to deposit the security with the depositary entity 130 for creation of the virtual receipt.

Issuing entity 120 may be an entity whose securities back the virtual receipt, whether it be an issuer's shares, a government bond, or an fund manager's bundled security (e.g., an ETF).

In an original issuance, a securities offering (e.g., an IPO), issuing entity 120 and asset originator 110 may be the same entity.

Depositary entity 130 may receive asset(s) from asset originator 110 and may authorize a virtual receipt for the received assets. The virtual receipt may be written to distributed ledger 140, which may be distributed ledger such as a Blockchain or Ethereum-based ledger.

In one embodiment, custodian 135 may hold the underlying assets for depositary entity 130. In one embodiment, depositary entity 130 and custodian 135 may be the same entity, and the custodian service related to the holding of the underlying assets by custodian 135 may be at the appointment of depositary entity 130.

In another embodiment, depositary entity 130 and custodian 135 may be different entities.

In one embodiment, depositary entity 130 may serve as an issuer of virtual receipts across a plurality of systems. For example, depositary entity 130 may mark-up or mark-down virtual receipt holder 150's virtual receipts across multiple distributed ledgers (e.g., 140) and enable virtual receipt holder 150 to sell, trade, etc. the virtual receipts across multiple systems, regardless of the system in which they were issued.

Virtual receipt holder 150 and potential virtual receipt holder 160 may be one or more parties to a transaction. For example, virtual receipt holder 150 may be a seller of a virtual receipt, and potential virtual receipt holder may be a buyer of a virtual receipt.

In one embodiment, virtual receipt holder 150 and/or potential virtual receipt holder 160 may conduct a transaction through a broker (not shown).

Figure 2:
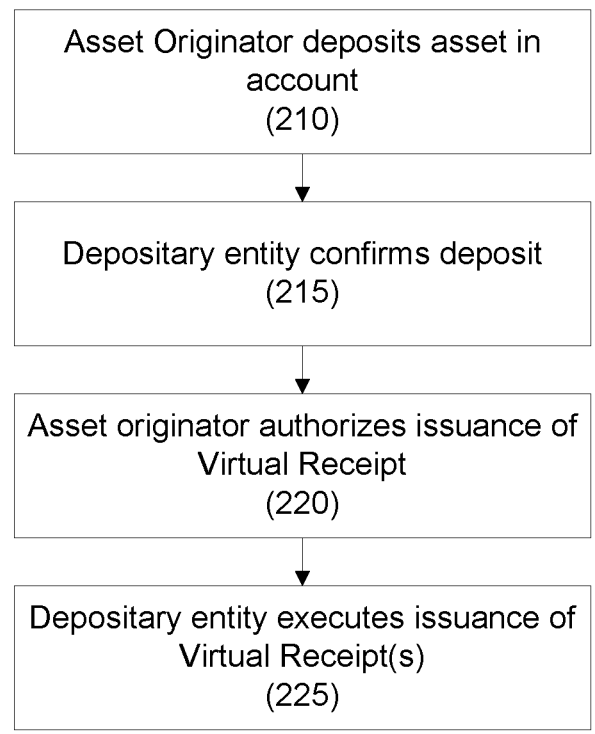
FIG. 2 depicts an exemplary method for asset encumbrance according to one embodiment.

Referring to FIG. 2, an exemplary method for asset encumbrance according to one embodiment. In step 210, an asset originator or an issuing entity may deposit an asset or obligation, or quantities thereof, in a designated account maintained by a depositary entity (e.g., an account established at a custodian that may be appointed by the depositary), thereby encumbering or ringfencing the asset. In one embodiment, the account may be administered and verified by the depositary entity on behalf of an issuing entity that issued the asset(s). In one embodiment, the asset originator may be the same as the issuing entity; in another embodiment, the issuing entity and the asset originator may be different entities.

In one embodiment, the asset(s) may be any suitable asset, such as securities, physical assets, loans, derivatives, commodities, equities, currency, indices, obligations, lines of credit, rights to such assets, etc. Other assets/types of assets may be included as is necessary and/or desired.

In one embodiment, the asset(s) may include a single asset, a pool/basket of assets, a nominal of an asset, etc.

In one embodiment, the asset may be deposited with a custodian that may be appointed by the depositary.

In step 215, the depositary entity may receive confirmation of the deposit from the depositary entity's custodian, and may provide confirmation of the asset deposit and encumbrance/ringfencing in a designated account via electronic message to the issuing entity or asset originator. Based on this confirmation, the depositary entity may issue a virtual receipt.

In step 220, the asset originator may authorize the depositary entity to issue a virtual receipt. In one embodiment, the virtual receipt may be issued to a distributed system or ledger. The purpose of the deposit of an asset with a depositary entity's custodian may be the issuance of one or more virtual receipt. The deposit by the asset originator may include, for example, instructions on delivery of the virtual receipts.

In step 225, the depositary entity may execute the issuance of the virtual receipt to the virtual receipt holder.

Figure 3:
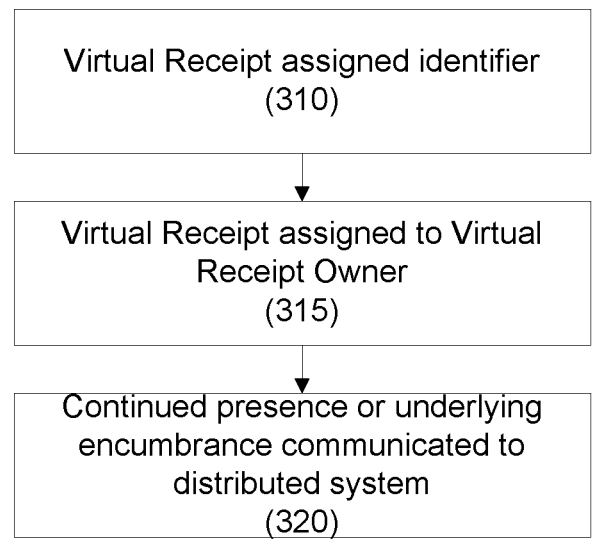
FIG. 3 depicts an exemplary method for virtual receipt issuance according to one embodiment.

Referring to FIG. 3, an exemplary method for the issuance of a virtual receipt is provided according to one embodiment. In one embodiment, the issuance of a virtual receipt may occur in a designated distributed system or ledger, in which network participants may validate updates to the system, which correspond to respective assets or transactions and their movement or settlement.

In step 310, the virtual receipt may be assigned an identifier that may be linked to, or representative of, the asset(s), and may contain data related to the asset(s), including price, quantity, trade date, etc.

In step 315, the virtual receipt may be assigned to a virtual receipt holder within the distributed system, and may undergo transfer to a potential virtual receipt holder as determined by the existing rules and architecture of the distributed system. In one embodiment, this may include interactions with other distributed systems, depositary entities, etc.

In step 320, the issuing entity and/or depositary entity may optionally communicate the presence and encumbrance or ringfencing of the asset(s) in a designated account, as well as any additional asset data, to the distributed system via any suitable electronic communication. This communication may be shared with multiple system participants including, for example, the depositary entity, virtual receipt holders, etc. as is necessary and/or desired. In one embodiment, the communication may be periodic (e.g., daily), on demand, or as otherwise necessary and/or desired.

Once issued, the virtual receipt may function as a way to facilitate a range of financial transactions, including, for example, remittance, trading, syndication, lending, etc.

In one embodiment, the virtual receipt may be written to the distributed system (e.g., a distributed ledger) in any suitable manner. In one embodiment, the writing may be interoperable with other distributed systems or ledgers.

Figure 4:
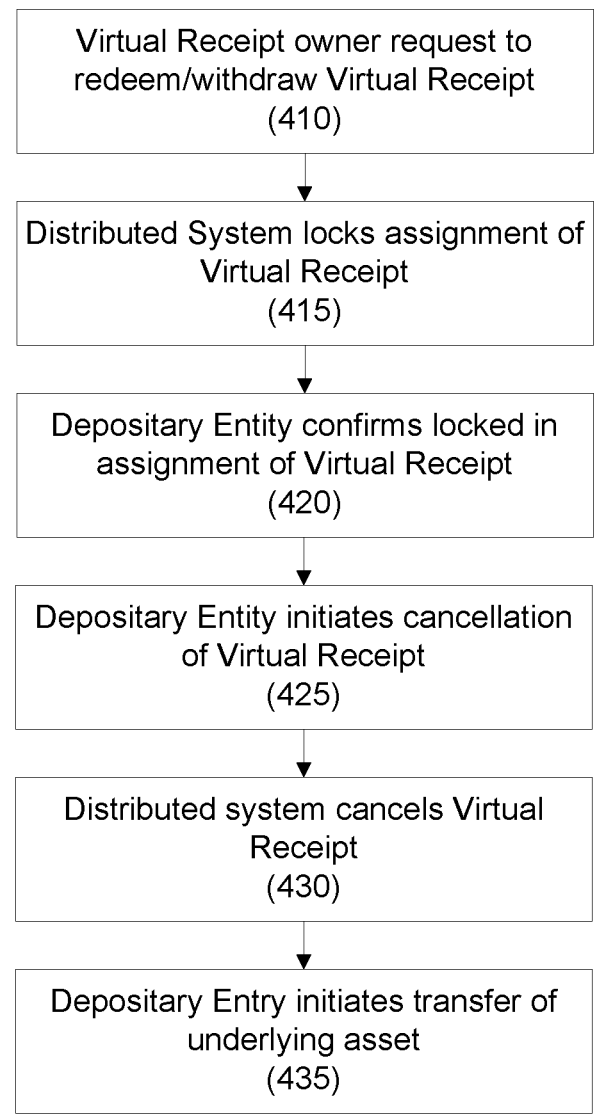
FIG. 4 depicts an exemplary method for virtual receipt redemption according to one embodiment.

Referring to FIG. 4, an exemplary method for the redemption or cancellation of a virtual receipt is provided according to one embodiment.

In step 410, a virtual receipt holder may request to redeem or withdraw the virtual receipt to a designated account by, for example, sending, an electronic message to the depositary entity, the distributed system, and/or a representative third party. In one embodiment, the virtual receipt holder may have a broker submit this request.

In another embodiment, the virtual receipt holder may deliver or surrender the virtual receipt, or a representation thereof, to the depositary entity.

In step 415, the distributed system may "lock in" an assignment of the designated virtual receipt to the virtual receipt holder and may communicate the locked-in status to the depositary entity. For example, the distributed ledger may tag, flag, or otherwise indicate that the virtual receipt cannot be further transferred or altered.

In step 420, upon receiving the redemption or withdrawal request, the depositary entity may confirm the locked-in assignment of the designated virtual receipt to the virtual receipt holder in the distributed system. For example, the depositary entity may verify that the virtual receipt entry on the distributed ledger has been tagged or flagged with an appropriate indicator.

In step 425, the depositary entity may initiate cancellation of the virtual receipt via electronic message to the distributed system. The cancellation may be based on existing rules and architecture. In step 430, the distributed system may cancel the virtual receipt by, for example, writing the cancellation to the distributed ledger.

In step 435, the depositary entity may initiate a transfer of the asset(s) from the account where it has been encumbered or ringfenced to a designated account. In one embodiment, the account may be identified in the virtual receipt holder's request. The initiation of the transfer may be communicated to the issuing entity and/or the distributed system.

In one embodiment, the transfer of the assets may occur outside the distributed system. For example, if a virtual receipt seller and a virtual receipt buyer agree to a transfer, a smart contract executed by the distributed system may effectuate the change in ownership on the distributed ledger.

In one embodiment, the virtual receipts may be traded on a secondary market. In one embodiment, changes in virtual receipt holders may not impact the asset(s).

In one embodiment, the virtual receipts may be serviced. For example, in one embodiment, virtual receipts may support servicing activities for the asset(s) and/or in relation to the virtual receipt holder, such as the processing of corporate events/actions, related payments, solicitation and execution of voting rights, issuance of additional VRs, cancellation of VRs, distribution of communications, etc.

Although multiple embodiments have been described, it should be recognized that these embodiments are not exclusive to each other and that features from one embodiment may be applied to others as desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for managing asset or obligation-backed virtual receipts on a distributed system comprising:
   receiving, via a computer processor of an information processing apparatus for a depositary entity and from a custodian, confirmation of a deposit of an underlying asset by an asset originator into an account maintained by the depositary entity with the custodian, wherein the asset originator holds the underlying asset;
   ringfencing, via the computer processor, the underlying asset in the account maintained by the depositary entity with the custodian;
   providing, via the computer processor, confirmation of the deposit and ringfencing to the asset originator;
   receiving, via the computer processor, authorization from the asset originator to issue a virtual receipt for the deposited underlying asset;
   executing, via the computer processor, issuance of the virtual receipt by writing a transaction to a distributed ledger;
   delivering, by the computer processor, the virtual receipt to a virtual receipt holder within the distributed system in accordance with instructions provided by the asset originator;
   assigning, via the computer processor, the virtual receipt to the virtual receipt holder;
   writing, by the computer processor, the assignment of the virtual receipt to the distributed ledger;
   receiving, via the computer processor, a request to redeem or cancel the virtual receipt from the virtual receipt holder to a designated account;
   locking, via one or more computer processors associated with the distributed system, an assignment of the virtual receipt to the virtual receipt holder on a distributed ledger, wherein locking an assignment comprises marking the virtual receipt so that it may not be transferred;
   confirming, via the computer processor, the locked-in assignment of the virtual receipt on the distributed ledger;
   canceling, via the one or more computer processors associated with the distributed system, the virtual receipt by writing the cancellation to the distributed ledger; and
   transferring via the one or more computer processors associated with the distributed system, the underlying asset from the account maintained by the depository entity with the custodian to the designated account identified in the virtual receipt holder's request.

2. The method of claim 1, wherein the confirmation is received from a custodian that received the deposit of the underlying asset.

3. The method of claim 1, wherein the virtual receipt comprises a token.

4. The method of claim 1, wherein the distributed ledger is a Blockchain-based ledger.

5. A system for managing asset or obligation-backed virtual receipts on a distributed system comprising:
   an asset originator;
   a depositary entity including a depositary entity processor; and
   a distributed ledger system in communication with the depository entity;
   wherein:
      the asset originator deposits an underlying asset with the depositary entity, via the depositary entity processor;
      the processor of the depositary entity ringfences the underlying asset in the account maintained by the depositary entity with the custodian;
      the processor of the depositary entity receives confirmation of the deposit of the underlying asset by the asset originator;
      the processor of the depositary entity receives authorization from the asset originator to issue a virtual receipt for the deposited underlying asset;
      the processor of the depositary entity executes issuance of the virtual receipt by writing a transaction to a distributed ledger;
      the processor of the depositary entity delivers the virtual receipt to a virtual receipt holder within the distributed system, in accordance with instructions provided by the asset originator;
      the processor of the depositary entity assigns the virtual receipt to the virtual receipt holder;
      the processor of the depositary entity writing the assignment of the virtual receipt to the distributed ledger;
      the processor of the depositary entity receives a request to redeem or cancel the virtual receipt from the virtual receipt holder to a designated account;
      one or more computer processors associated with the distributed system locking an assignment of the virtual receipt to the virtual receipt holder on a distributed ledger by marking the virtual receipt so that it may not be transferred;
      the processor of the depositary entity confirms the locked-in assignment of the virtual receipt on the distributed ledger;
      the one or more computer processors associated with the distributed system cancelling the virtual receipt by writing the cancellation to the distributed ledger; and
      the one or more computer processors associated with the distributed system transferring the underlying asset from the account maintained by the depository entity with the custodian to the designated account identified in the virtual receipt holder's request.

6. The system of claim 5, wherein the depositary entity receives confirmation of the deposit of the underlying asset by the asset originator from a custodian that received the deposit of the underlying asset.

7. The system of claim 5, wherein the virtual receipt comprises a token.

8. The system of claim 5, wherein the distributed ledger is a Blockchain-based ledger.

* * * * *